United States Patent Office 3,498,948
Patented Mar. 3, 1970

3,498,948
REACTION PRODUCTS OF TETRACARBOXYLIC ACID DIANHYDRIDES WITH TRIAMINES AND MIXTURES OF TRIAMINES AND DIAMINES
Muneyoshi Minami, Haruki Maekawa, Takashi Kubota, Yoshizo Tsuda and Kazuo Kitamura, Ohtsu-shi, Yoshitaka Tatsuno, Amagasaki-shi, and Masamoto Watanabe and Yasuro Kawabata, Ohtsu-shi, Japan, assignors to Toyo Rayon Kabushiki Kaisha, Tokyo, Japan, a corporation of Japan
No Drawing. Filed Sept. 13, 1966, Ser. No. 579,007
Claims priority, application Japan, Sept. 13, 1965, 40/55,663, 40/55,664; Oct. 13, 1965, 40/62,417; Jan. 28, 1966, 41/4,568; Feb. 25, 1966, 41/11,036; May 11, 1966, 41/29,384
Int. Cl. C08g 20/32
U.S. Cl. 260—47                  14 Claims

ABSTRACT OF THE DISCLOSURE

Thermally stable polymers consisting essentially of:
(a) The recurring structural unit of the formula

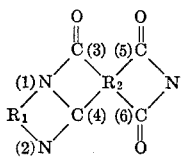

wherein $R_1$ is a trivalent aromatic radical, $R_2$ is a tetravalent organic radical, bonds (1) and (2) are bonded to adjacent carbon atoms in radical $R_1$, and bonds (3) and (4), as well as bonds (5) and (6), are bonded to adjacent carbon atoms in radical $R_2$; or
(b) The above recurring structural unit and the recurring structure unit of the formula

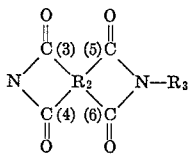

wherein $R_2$ and bonds (3), (4), (5), and (6) have the same meanings as defined above, and $R_3$ is a divalent organic radical.

Such polymers are prepared, for example, by mixing at least one triamine of the formula

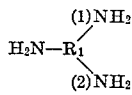

or a mixture of at least one triamine and at least one diamine of the formula

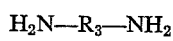

$$H_2N-R_3-NH_2$$

with at least one tetracarboxylic acid dianhydride of the formula

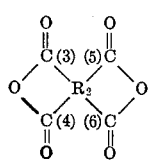

in an organic solvent at a temperature below 80° C. with subsequent dehydration of the obtained polyamide acid amine at a temperature above 50° C., said polymers being useful as films, wire coatings, and in the form of shaped articles.

———

This invention relates to a novel thermally stable polymer, a prepolymer thereof and processes for preparing these polymers. More particularly, this invention relates to a polymer containing in its high molecular weight main chain a recurring unit consisting of an imido ring and an imidazopyrrolon ring, a prepolymer thereof containing a recurring unit of an amide acid amine and processes for preparing these polymers.

Heretofore it has been well known that polyimide obtained by dehydrating polyamide acid obtained by reacting a tetra-carboxylic acid dianhydride with a diamine has excellent thermal stability and physical properties. Because of its excellent elongation, such polyimide is used by preference as a wire enamel, however, its hardness is not necessarily satisfactory due to which it has a defect of an inferior abrasion resistance.

On the other hand, it is already known that a polymer having in its high molecular main chain an imidazopyrrolon ring has excellent properties as a thermally stable polymer, and as a process for preparing such polymer, a process of reacting a tetra-carboxylic dianhydride with a tetramine to obtain a polyamide as an intermediate and dehydrating and ring closing said polyamide has been proposed. However, in a polymer having such structure because its high molecular weight chain is too rigid, when used as a film or a wire enamel it has a defect in practical use of being poor in bending property and having a very small elongation. Further, a polymer containing such imidazopyrrolon ring only has, when applied as coating to a metal conductor such as, for instance, a copper wire, there is a defect of a poor adhesiveness and the coating tends to peel off.

As such, the hitherto known heat-resistant polymer is satisfactory in heat resistance and electrically insulating property; however, a polymer having a satisfactory combination of an abrasion resistance and a proper elongation which are most necessary as a thermally stable polymer has not been known yet.

A primary object of this invention is to provide a novel thermally stable polymer having a preferable combination of an abrasion resistance and a proper elongation as well as excellent tenacity and anti-peeling property when applied as a coating.

An object specified by this invention is to provide a polymer containing in its high molecular weight main chain a recurring unit consisting of an imide ring and an imidazopyrrolon ring.

Another object of this invention is to provide a prepolymer of said thermally stable polymer capable of being easily subjected to a shaping operation to make it a final polymer, which is stable when stored as is and the deterioration of which take place to a substantial extent when it is subjected to a shaping operation.

A further object of this invention is to provide processes for preparing said thermally stable polymer and its prepolymer without passing through complicated means.

Other objects and advantages of this invention will become apparent from the following description.

The aforesaid objects will be attained according to this invention by a thermally stable polymer containing a recurring unit of the general formula

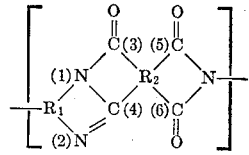

(I)

wherein $R_1$ stands for a trivalent aromatic radical having 1–3 benzene nuclei, $R_2$ stands for a tetravalent organic radical having 4–18 carbon atoms, bonds (1) and (2) bond to adjacent carbon atoms in the radical $R_1$ and bonds (3) and (4) which are the same as bonds (5) and (6) bond to adjacent carbon atoms in the radical $R_2$, respectively In a recurring unit represented by said general Formula I, it is preferable that said radical $R_1$ is a trivalent benzene ring, a trivalent naphthalene ring a trivalent radical of the formula

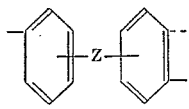

wherein Z stands for a direct bond bonding two benzene rings, an alkylene having 1–3 carbon atoms

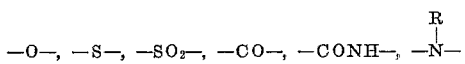

(R is an alkyl having 1–4 carbon atoms or benzenoid aryl group), or a

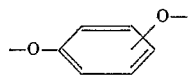

group, or a trivalent heterocyclic ring, and it is preferable that Z is in para-position to either one of N-substituted radicals.

Said tetravalent organic radical $R_2$ is a tetravalent residue of an aromatic group, an aliphatic group, an alicyclic ring or a heterocyclic ring, preferably it is a tetravalent butane radical, a tetravalent cyclopentane radical, a tetravalent cyclohexane radical, a tetravalent benzene ring, a tetravalent naphthalene ring or a radical of the formula

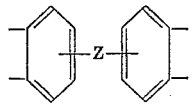

wherein Z is a direct bond bonding two benzene rings, an alkylene having 1–3 carbon atoms

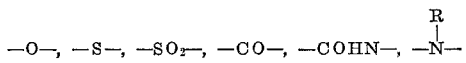

(R of which is alkyl having 1–4 carbon atoms or benzenoid aryl group) or a

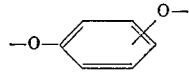

group and it is preferable that Z is in para-position to either one of carbonyl-substituted radicals The thermally stable polymer of this invention includes not only a polymer having a recurring unit consisting of an imidazopyrrolon ring and an imide ring represented by said general Formula I, but also a polymer containing, besides a recurring unit of said general Formula I, a recurring unit of the general formula

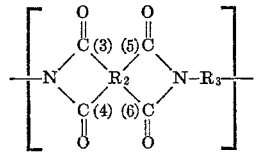

wherein $R_2$ (3), (4), (5) and (6) have meanings as defined before and $R_3$ stands for a divalent organic radical having 2–18 carbon atoms which construct an aromatic group, an aliphatic group, an alicyclic group, a mixed group of them, or the above-mentioned groups that are combined by the above defined bond Z.

A thermally stable polymer having a recurring unit of said Formula I and recurring unit of said Formula II is especially preferable because a desired combination of proper elongation and abrasion resistance can be obtained by varying the ratio of the two recurring units in the main chain of the polymer. Generally speaking, it is preferable that said thermally stable polymer contains 2–100 mol percent, especially 5–80 mol percent of the recurring unit of said Formula I and 0–98 mol percent, especially 20–95 mol percent of the recurring units of said Formula II.

The polymer of this invention should have an inherent viscosity ($\eta$ inh) of at least 0.1 measured as a 0.5% solution in a concentrated sulfuric acid at 30° C. The inherent viscosity ($\eta$ inh) is represented by the equation.

$$\eta \text{ inh} = \frac{ln(\eta \text{ rel})}{C}$$

wherein $ln$ is a natural logarithm, C is a gram number of the polymer in 100 cc. of the solution and $\eta$ rel is an relative viscosity.

According to the process of this invention, these thermally stable polymers are prepared by a process of reacting the amines selected from the group consisting of a triamine of the formula

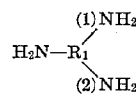

wherein $R_1$ stands for a trivalent aromatic radical having 1–3 benzene nuclei and bonds (1) and (2) bond to adjacent carbon atoms in the radical $R_1$ or a mixture of said triamine and a diamine of the formula $$H_2N—R_3—NH_2$$

wherein $R_3$ stands for a divalent organic radical having 2–18 carbon atoms with a tetra-carboxylic acid dianhydride of the formula

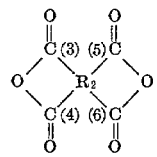

wherein $R_2$ stands for a tetravalent organic radical, and bonds (3) and (4) which are the same as bonds (5) and (6) bond adjacent carbon atoms in the radical $R_2$, respectively in an organic solvent at a temperature below 80° C., and dehydrating the obtained polyamide amino acid at a temperature above 50° C.

Triamines preferably used in the process of this invention have the following structural formula.

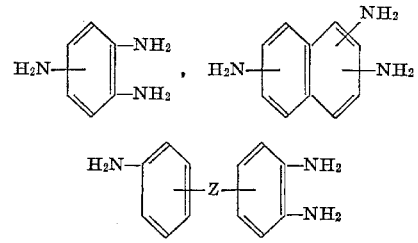

wherein Z has the meaning as defined before.

Of the three amino radicals of said triamines, two amino radicals must bond two carbon atoms mutually adjacent in the aromatic ring One other amino radical may be bonded at any place. The trivalent aromatic group represented by $R_1$ of the formula of said triamine may be substituted by an alkyl, cycloalkyl, aryl, alkoxy or aryloxy radical having 1–12 carbon atoms or a halogen (such as F, Cl, Br, etc.).

The triamines suitable for carrying out the reaction are shown by specific compound names, they are as follows:

3,4,4'-triamino-diphenylether,
3,4,3'-triamino-diphenylether,
3,4,4'-triamino-diphenylmethane,
3,4,4'-triamino-diphenylpropane,
1,2,4-triaminobenzene,
2,4,5-triaminotoluene,
2,4,5-triaminoanisole,
3,4,4'-triamino-diphenylsulfone, 3-amino-benzidine,
5-amino-o-dianisidine,
3,3'-dichloro-5-amino-benzidine,
3,3'-dimethyl-5-aminobenzidine,
3,4,4'-triamino-diphenylsulfide,
3,4,3'-triamino-diphenylsulfone,
3,4,4'-triamino-diphenyl-N-methyl-amine,
3,4,4'-triamino-triphenyl-amine,
3,4,4'-triaminobenzanilide,
1-(3',4'-diaminophenoxy)-4-(4''-aminophenoxy) benzene,
2,3,6-triaminopyridine,
1,2,5-triaminonaphthalene,
2-(3',4'-diaminophenyl)-5-aminobenzoxazole, and
2,3,7-triaminoacridine.

These triamines may be used either singly or in combination.

As diamines of the formula H$_2$N—R$_2$—NH$_2$ used with said triamines, one whose R$_2$ is a divalent aromatic group, aliphatic group, alicyclic group or heterocyclic group is preferable, of which a divalent aromatic group is especially preferable.

As diamines suitable for use in this invention, there may be cited metaphenylenediamine,
paraphenylenediamine,
4,4'-diaminodiphenylpropane,
4,4'-diaminodiphenylethane,
4,4'-diaminodiphenylmethane,
benzidine,
4,4'-diaminodiphenylsulfide,
4,4'-diaminodiphenylsulfone,
3,3'-diaminodiphenylsulfone,
para-bis-(4-aminophenoxy) benzene,
4,4'-diaminodiphenylether,
4,4'-diaminodiphenyl-N-methylamine,
1,5-diaminonaphthalene,
3,3'-dimethyl-4,4'-diaminodiphenyl,
4,4'-diaminotriphenyl amine,
3,4'-diaminobenzanilide,
4-(para-aminophenoxy)-4'-aminobenzanilide,
3,4'-diaminodiphenylether,
3,3'-dimethoxybenzidine,
2,4-bis(betaamino-tertiary butyl) toluene,
bis-(para-betaamino-tertiary butylphenyl) ether,
metaxylylenediamine,
paraxylylenediamine,
di(para-amino-cyclohexyl) methane,
hexamethylenediamine,
heptamethylenediamine,
octamethylenediamine,
nonamethylenediamine,
4,4'-dimethylheptamethylenediamine,
3-methoxy-heptamethylenediamine,
2,11-diaminododecane,
1,4-diaminocyclohexane and their mixture.

A tetra-carboxylic acid dianhydride used in the process of this invention is a compound represented by the general formula

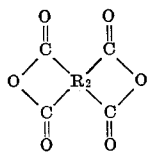

wherein as a tetravalent organic radical R$_2$, an aromatic group, an aliphatic group, an alicyclic group, a heterocyclic group or a combination thereof or a substitute thereof are preferable, of which that which is especially preferable is a compound having at least 6 carbon atoms. Four carbonyl radicals are preferably bonded to different carbon atoms, respectively 2 carbonyl radicals are necessarily bonded to adjacent carbon atoms so that a cyclic anhydride may be formed. R$_2$ usually used consists of a condensation cyclic compound containing benzene, biphenyl and 2-3 benzene rings and a 5- or 6-member heterocyclic ring containing hetero atom consisting of sulfur, nitrogen or oxygen.

Of such tetra-carboxylic acid dianhydride, as what is preferable, there may be cited pyromellitic acid dianhydride,
bis(3,4-dicarboxyphenyl) ether dianhydride,
1,4 or 1,3-bis(3,4-dicarboxyphenoxy) benzene dianhydride,
2,3,6,7-naphthalenetetracarboxylic acid dianhydride,
1,2,5,6-tetracarboxynaphthalene dianhydride,
2,2',3,3'-tetracarboxybiphenyl dianhydride,
2,2-bis(3,4-dicarboxyphenyl) propane dianhydride,
naphthalene-1,2,4,5-tetracarboxylic acid dianhydride,
naphthalene-1,4,5,8-tetracarboxylic acid dianhydride,
2,2-bis(2,3-dicarboxyphenyl) propane dianhydride,
1,1-bis(2,3-dicarboxyphenyl) ether dianhydride,
1,1-bis(3,4-dicarboxyphenyl) ethane dianhydride,
bis(2,3-dicarboxyphenyl) methane dianhydride,
benzene-1,2,3,4-tetracarboxylic acid dianhydride,
3,4,3',4'-tetracarboxybenzophenone dianhydride,
1,1,2,2-ethanetetracarboxylic dianhydride,
1,2,3,4-butanetetracarboxylic dianhydride,
1,2,3,4-cyclopentane tetracarboxylic dianhydride,
1,2,3,4-cyclohexane tetracarboxylic dianhydride, and a mixture thereof.

According to the process of this invention, said triamine or a mixture of said triamine and said diamine and tetra-carboxylic acid dianhydride are mixed in an organic solvent which can dissolve at least one of these reactants and which is inert to these reactants. Thus, a linear polymer containing amide acid amine as a recurring unit is formed. It is necessary that the reaction temperature employed is below 80° C. and especially a temperature within the range of from —20° to 40° C. is preferable. The prepolymer of this invention so obtained a recurring unit of the general formula

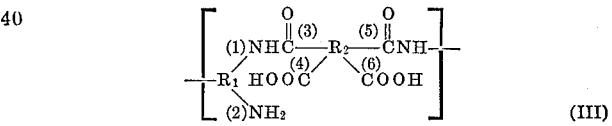
(III)

wherein R$_1$ stands for a trivalent aromatic radical having 1–3 benzene nuclei, R$_2$ stands for a tetravalent organic radical having 4–18 carbon atoms, bonds (1) and (2) bond adjacent carbon atoms in the radical R$_1$, and bonds (3) and (4) same as bonds (5) and (6) bond adjacent carbon atoms in the radical R$_2$.

When a diamine is conjointly used, the prepolymer of this invention contains, besides a recurring unit represented by said Formula III, a recurring unit of the general formula

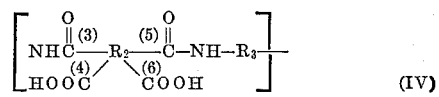
(IV)

in these formulae, R$_1$, R$_2$, (1), (2), (3), (4), (5) and (6) have the same meanings as defined before, and R$_3$ stands for a divalent organic radical having 2–18 carbon atoms.

In this copolymerized polyamide acid, it is preferable that the molar ratio of the recurring unit of the Formula III and the recurring unit of the Formula IV correspond to the molar ratio of the triamine and the diamine employed in the reaction, generally speaking, 2–100:0–98, especially 5–80:20–95.

These recurring units can exist at an optional ratio in the main chain of the copolymer. For instance, it is possible to effect random copolymerization by at first dissolving the entire amount of a diamine and a triamine in the reaction medium, followed by addition thereto of a tetra-carboxylic acid dianhydride, or it is possible to make the structure of the copolymer close to that of a block copolymer by at first reacting a diamine and a tetra-carboxylic acid dianhydride in a medium, thereafter adding thereto a triamine and a tetra-carboxylic acid or effecting addition in the contrary sequence to the medium.

Upon preparing said prepolymer, normally it is preferable to use the reactants in equimolar amounts, however, either one may be used in excess as the occasion demands. However, if the excess exceeds 5%, a low molecular weight substance may be obtained, therefore care must be taken. And in order to control the molecular weight, it is possible to add a known stopping agent such as, for instance, aniline to such reaction. It is preferable that a solvent used in polymerization is that which does not substantially react with the starting materials and which dissolves at least one of these starting materials. As such solvent, a N,N-dialkylcarboxylamide such as dimethyl formamide, dimethylacetamide, diethylacetamide, N-methyl-2-pyrrolidone and N-methyl caprolactam is preferably used, however, dimethylsulfoxide, tetramethylurea, pyridine, dimethyl sulfone, hexamethylphosphoamide, tetramethylene sulfone, formamide, N-methylformamide, butylrolactone and N-acetyl-2-pyrrolidone may be used similarly. It is possible to use them singly or in combination, and it is also possible to add benzene, toluene, nitrobenzene, chlorobenzene, dioxane and cyclohexanone.

As to the amount of the reactants employed there is no particular limit insofar as it is an amount sufficient to form a good polymerization system, however, normally when such an amount as may result in obtaining a product containing 0.05–50% of the solid component is used, a high molecular weight polyamide acid amine is obtainable. The fact that in this invention by reacting a tetra-carboxylic acid dianhydride which reacts as a divalent compound at a low temperature with a triamine having three amino groups, a substantially linear polyamide acid amine soluble in various organic solvents is obtained is entirely unexpected from a common sense viewpoint inasmuch as generally a triamine having three functional amino groups form an insoluble polymer of a three-dimensional net structure. Namely, it is considered that two out of three amino groups of a triamine used in the process of this invention bond adjacent carbon atoms in an aromatic ring, and so when one out of two amino radicals is acylated the reactivity of the remaining one amino radical is lowered, resulting in no formation of gelated products. From this viewpoint, it is preferable to pour dropwise a solution of a tetra-carboxylic acid dianhydride to a triamine solution or to cool the triamine solution to add the tetracarboxylic acid dianhydride. In order to prevent gel formation, the reaction is carried out below 80° C. preferably below 50° C.

In accordance with one preferred embodiment of the process of this invention, an aromatic triamine or a mixture of said triamine and a diamine may be reacted with a tetra-carboxylic acid dianhydride in an organic solvent containing water resulting in the formation of a high molecular weight polyamide acid amine. At this time, it is preferable to add water in an amount of 0.05–10%, especially 0.5–5% based on the solvent to said polar organic solvent. When, a polar organic solvent added with another solvent immiscible with water such as toluene, it is necessary to control the added amount to such an extent as may not break a uniform phase.

As to the temperature, in order to avoid gelation at the polymerization process and a ring closure of a polyamide acid amine and to inhibit an undesirable reaction of the starting material and the polymer with water, it is preferably below 80° C., and normally a temperature from −20° C. to 50° C. is preferably used. Especially when the amount of triamine relative to diamine used is large, a lower temperature is advantageous.

According to this preferred embodiment, by addition of water to the reaction system, without recognizable gelation the reaction proceeds very smoothly, a linear polyamide acid amine of a high degree of polymerization is produced at a good yield, moreover, the obtained polyamide acid solution can almost completely prevent occurrence of gelation even if the solution is stored as it is.

According to another preferred embodiment of this invention, a solution obtained by dissolving an aromatic triamine or a mixture of said triamine and a diamine in an organic solvent capable of dissolving a polyamide acid amine which is to be produced may be treated with a solution obtained by dissolving a tetra-carboxylic acid dianhydride in an organic solvent which is a poor solvent to a polyamide acid amine which is to be produced but having compatibility to be miscible with said solvent of polyamide the acid amine resulting in a high molecular weight polymer.

In this preferred embodiment as a solvent for the acid amine polymer N,N-dimethylacetamide N,N-dimethylformamide, N-methyl-2-pyrrolidone, N,N-diethylformamide, N,N - diethylacetamide, N,N - dimethylmethoxyacetamide, dimethylsulfoxide, pyridine, dimethylsulfone, hexamethylphosphoramide, tetramethylsulfone and dimethyltetramethylenesulfone may be cited as representative examples.

On the other hand, as a solvent for a tetra-carboxylic acid dianhydride, aliphatic alicyclic or aromatic ketones such as acetone, methylethyl ketone, cyclohexanone and acetophenone, lactones such as butyrolactone, aromatic esters such as dimethyl phthalate, nitro compounds such as nitromethane and nitrobenzene and cyclic ethers such as tetrahydrofuran or halogen or alkyl substituents thereof may be cited as representative examples.

According to this preferred embodiment, by dissolving a tetra-carboxylic acid dianhydride in a solvent which is a poor solvent to the polymer to be produced and adding this mixture to the polymerization system, a polyamide acid amine of a high degree of polymerization having an inherent viscosity of above 0.5 is obtainable without being accompanied by substantial occurrence of gels. In this case, the using ratio of the two solvents may be within such a range so as to as may maintain the produced polymer substantially in a solution state in a mixture of a solvent for the dianhydride and a solvent for the amine. The polymerization temperature is below 80° C., preferably below 50° C.

According to a further preferred embodiment of the process of this invention, an aromatic triamine and a mixture of said triamine and a diamine is reacted with a tetra-carboxylic acid dianhydride in a phenol solvent containing a secondary or tertiary amine.

As such phenol solvent, phenol, o-cresol, m-cresol, p-cresol, mixed cresol and xylenol is used.

Such phenol solvents may be used singly or in combination with an aromatic hydrocarbon such as toluene, naphtha, xylene and benzene. However, mere reaction of monomer components in such phenol solvent does not enable one to obtain a high polymer and during the reaction a lower polymer precipitates in a powdery state. Therefore, in this embodiment, in order to inhibit gelation due to the triamine and obtain a concentrated homogeneous polymer solution of a high degree of polymerization, it is indispensable to make a secondary or tertiary amine co-exist in the polymerization system. As such secondary or tertiary amine, diisopropylamine, di-n-butylamine, di- sec-butylamine, di- tert-butylamine, di-n-amylamine, diisoamylamine, N-ethylaniline, N-n-propylaniline, N-isopropylaniline, N- sec-butylaniline, N-tert-butylaniline, N-tert - hexylaniline, dicyclohexylamine, 2,6-dimethylpiperidine, 3,5-dimethylmorpholine, 2,3,5,6-tetra-methylpiperidine; pyridine; a pyridine derivative such as methylpyridine, ethylpyridine, isopropylpyridine, tert-butylpyridine, 2,6-dimethylpyridine, 2,3-dimethylpyridine and 2,4,6-trimethylpyridine; an N,N-2 substituted aniline derivative such as N,N-dimethylaniline, N,N-diethylaniline, N,N-di-n-propylaniline, N,N - diisopropylaniline and N,N-di-n-butylaniline; an aliphatic tertiary amine such as triethylamine, tri-n-propylamine and tri-n-butylamine; an N,N-2 substituted toluidine such as N,N-dimethyl-p-toluidine; N,N - diethyl-m-toluidine, N,N-diethyl-p-toluidine and N,N-diisopropyl-p-toluidine; a quinoline derivative such as quinoline, methylquinoline, 2,4-dimethylquinoline and 2,3,8-trimethylquinoline; an isoquinoline derivative such as isoquinoline and 2-methyl-isoquinoline; and N substituted pyrrolidine such as N-methylpyrrolidine, N-phenylpyrrolidine and N-benzylpyrrolidine; an N-substituted piperidine such as N-ethylpiperidine and N-n-butylpiperidine; and α substituted pyrroline such as α-benzoylpyrroline, α-phenylpyrroline and α-toluilpyrroline; and an N-substituted morpholine such as N-ethylmorpholine and N-n-butylmorpholine may be cited as representative examples.

According to this embodiment, a solution of a polyamide acid amine of a high concentration and a high viscosity is formed without causing substantial gelation, moreover, this solution is stable to storage. As this solvent is very inexpensive, a polyamide acid amine solution especially suitable for such uses as insulating enamel and varnish is provided.

Of said secondary amine and tertiary amine used in the polymerization in phenol, when the produced polyamide acid amine polymer solution is used as an insulating enamel varnish or film casted by a dry process, the amine whose boiling point is higher than or same as that of the solvent phenol is preferable. As to the using amount of such secondary or tertiary amine used, 0.1–10 mol equivalent, especially 0.5–5 mol equivalent based on the monomer components is preferable. These amines may be added to the polymerization system prior to the start of the polymerization or during the reaction. As the reaction temperature, insofar as it is a temperature substantially capable of inhibiting gelation, there is no particular limit, however, normally below 80° C., especially a temperature within the range of from 0° to 50° C. is used by preference.

Thus, according to the process of this invention, a solution of a polyamide acid amine having an excellent shapability and substantially free of gelation after storage for a long period is directly obtained by a polymerization reaction.

The structural unit of the main chain of a polyamide acid amine may consist of amido bonds only or may contain partly dehydrated closed ring structures insofar as they have shapability.

The polyamide acid amine of this invention per se has excellent chemical, thermal and electric properties. However, after directly substituting, properly solvent substituting, concentrating or diluting a solution of a polyamide acid amine, subjecting the solution to operations of spinning, film forming, wire coating or adhesion, thereafter dehydrating the solution to convert it to a polymer mainly consisting of imide-imidazopyrrolon recurring structural units thereby more preferably thermal stability, chemical resistance and electric properties are improved.

A dehydration reaction of a polyamide acid amine is practical according to a normal method of intramolecular dehydration. That is, normally a process of treating said acid amine at a temperature sufficient to bring about a dehydration reaction or treating said polyamide acid amine with a dehydrating agent such as carboxylic acid anhydride is adopted. The heating temperature of the former dehydration treatment with heat is normally above 50° C., especially the range of 170–400° C. is preferable. Also it is preferable that the reaction system in this case is in a state of non-oxidation such as under a reduced pressure or in an inert gas current. As a dehydrating agent used in the latter chemical treatment, a carboxylic acid anhydride such as acetic anhydride, propionic anhydride and benzoic anhydride is preferably used, however, when these agents are used especially in the co-presence of a basic material such as pyridine and quinoline, the effect will be increased. It was also a discovery that in the polyamide acid amine of this invention, degradation of the polymer does not substantially take place upon said dehydrating ring-closing reaction.

As another process for preparing the polymer of this invention, a process of reacting a triamine of the formula

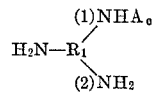

wherein $R_1$ stands for a trivalent aromatic radical having 1–3 benzene nuclei, $A_c$ stands for an acyl radical, and bonds (1) and (2) bond adjacent carbon atoms of the radical $R_1$, with a tetra-carboxylic acid dianhydride of the formula

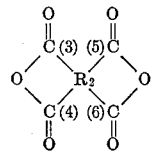

wherein $R_2$ stands for a tetravalent organic radical having 4–18 carbon atoms, and bonds (3) and (4) same as bonds (5) and (6) bond adjacent carbon atoms of the radical $R_2$ to form a polyamide acid amide, thereafter dehydrating and deacylating said polyamide acid amide may be used.

As an acylaminodiamine used in said process, there may be cited 4-formamido-3,4'-diamino-diphenylether,
4-acetamido-3,4'-diamino-diphenylether,
4-benzamido-3,4'-diamino-diphenylethane,
4-propionamido-3,4'-diaminodiphenylpropane,
1-acetamido-2,4-diaminobenzene,
4-formamido-2,5-diaminotoluene,
4-acetamido-2,5-diaminoanisole,
4-acetamido-3,4'-diamino-N-methyl-diphenylamine,
4-propionamido-3,4'-diamino-diphenylsulfone,
3-chloroacetamido-benzidine,
4-acetamido-3,4'-diamino-diphenylsulfide,
4-acetamido-3-aminobenz-4-aminoanilide,
2-acetamido-3,6-diaminopyridine,
1-heptanamido-2,5-diaminonaphthalene,
2-(4'-acetamido-3'-aminophenyl)-5-aminobenzooxazole,
and
3-acetamido-2,7-diaminoacridine.

The tetra-carboxylic acid dianhydride used is as mentioned above, and as to other polymerization conditions, dehydrating and deacylating conditions, the conditions mentioned above may be used per se.

The polyimideimidazopyrrolon of this invention so obtained has not only very excellent thermal stability and anti-oxidation property but also a desirable combination of elongation and abrasion resistance as material for electric insulation use in thermally stable shaped articles. Moreover, the polymer of this invention, when applied as coating to a substrate like wire, has excellent peeling resistance.

Thus, the polymer of this invention is especially useful as film, wire coating, especially coated wire enamel, varnish, shaped articles, laminate, painting and adhesive used at high temperatures.

Next, this invention will be explained by the following examples.

EXAMPLE 1

A 300 cc. 4-necked flask was fitted with a stirrer, a thermometer, a conduit for introducing nitrogen and discharge conduit. The discharge conduit was connected to a calcium chloride tube. Into the flask 4.305 g. of sufficiently purified and dried 3,4,4'-triaminodiphenylether was added, while dry nitrogen was passed, 80 g. of N-methylpyrrolidone was added thereto and the former was dissolved in the latter in an ice water bath.

4.362 g. of sublimed and purified pyromellitic acid dianhydride was dissolved in 80 g. of anhydrous N-methylpyrrolidone and poured dropwise onto said solution. Immediately, an exothermic reaction started. When majority of the solution was added, the viscosity began to rise remarkably. One hour later, the ice water bath was removed and stirring was continued for 30 minutes, then a viscous yellow solution of a polyamide was obtained. A part of the polymer solution was cast on a glass plate and put inside a dryer at 40° C. In one hour, the temperature of the drier was raised to 100° C. for 2 hours, and a yellowish brown transparent and tenacious film was obtained. When said film was taken to a frame, heated at 100° C. for 30 minutes inside a reduced-pressure oven, thereafter the temperature was gradually raised and said film was heated at 300–320° C. for 1 hour, a red transparent tenacious film was obtained. It was understood from an infrared spectrum that the recurring unit of this polymer was mainly composed of an imide ring and an imidazopyrrolon ring. When the remnant of the polymer solution was poured into water to separate a polymer, a fibrous polymer was obtained. After being washed with methanol and acetone, said polymer was dried for 2 days inside a reduced-pressure dryer at 50° C. The inherent viscosity of the produced polymer (as measured at a concentration of 0.5 g. of the polymer in 100 g. of N-methyl-2-pyrrolidone at 30° C.) was 0.86.

EXAMPLE 2

A 500 cc. blender was charged with 5.266 g. of 3,4,4'-triaminodiphenylsulfone and 90 g. of anhydrous N-methylpyrrolidone, and the former was dissolved in the latter in an ice water bath with tender stirring. 4.3624 g. of pyromellitic acid dianhydride was dispersed in 50 g. of anhydrous N-methylpyrrolidone and 30 cc. of toluene, and the resultant product was added to the blender stirred at a high speed. During the reaction, dry nitrogen was passed to the blender to exclude humidity.

A yellowish brown viscous polyamide solution was obtained.

A copper wire was passed into this polymer solution, dried at a tubular furnace at 150° C., again immersed in the solution and dried. These operations were repeated for 8 times and the wire was heated at 150° C. for 30 minutes. An enameled wire so obtained had a yellowish brown strong film, which when heated at 300° C. under a reduced pressure for 1 hour gave a good polyimideimidazopyrrolon enameled wire having a blood red strong film.

EXAMPLE 3

A dry 100 cc. 3-necked flask was charged with 2.413 g. of 3-aminobenzidine and 50 g. of N,N-dimethylacetamide, and the former was dissolved in the latter. 3.222 g. of 3,4,3',4'-tetracarboxybenzophenone dianhydride dissolved in 50 g. of N-methylpyrrolidone was poured dropwise in 20 minutes. The reaction temperature raised to 40° C.

When stirring was continued, the temperature dropped to 30° C. A polyamide solution so obtained was cast on a glass plate, dried for about 2 hours in a dryer at 80° C., thereafter said polyamide film was immersed in a 1:1 pyridine-anhydrous acetic acid mixture, and then the film was fixed at a frame, heated at 100° C. for 1 hour inside a dryer, again the temperature was gradually raised to 300° C. in a nitrogen atmosphere and said temperature was maintained for 30 minutes. A polyimide-imidazopyrrolon film so obtained was blood brown transparent and endured over 10,000 bending tests. The tensile strength was 14 kg./cm.$^2$ and the dielectric strength was above 100 kv./mm. When the film was heated at 250° C. in the air overnight, no change was recognized.

This polymer was not affected by all the organic solvents attempted.

EXAMPLE 4

Same as in Example 1, from 1,3,4-triaminobenzene and 2,2-bis(3,4-dicarboxyphenyl) propane dianhydride a polyamide having an inherent viscosity of 1.02 was obtained at a yield of 99%. A good film was obtained therefrom. When dehydrated as in Example 3, a red transparent tenacious film of polyimideimidazopyrrolon was obtained.

EXAMPLE 5

Same as in Example 1, 2 - (3',4'-diaminophenyl) - 5-aminobenzoxazole was reacted with a cyclohexanetetracarboxylic acid dianhydride in dimethylacetamide at 0° C. to obtain a polyamide having an inherent viscosity of 0.65 at a yield of 92%.

When said polyamide was heated at 250° C. under 0.1 mm. Hg for 15 hours in a reduced-pressure dryer, a polymer containing hetero rings and having a melting point over 300° C. was obtained.

EXAMPLE 6

The 4-necked flask used in Example 1 was charged with 1.686 g. of sufficiently purified and dried 3,4,4'-triamino-diphenylether and 1.507 g. of 4,4'-diaminodiphenylether, while dry nitrogen is passed. 125 cc. of N-methylpyrrolidone was added and said 2 amines were dissolved in the N-methylpyrrolidone in an ice water bath. 3.350 g. of sublimed and purified pyromellitic acid dianhydride was dissolved in 80 g. of N-methylpyrrolidone and poured to said solution. Immediately, an exothermic reaction started. When the majority of the solution was dropped, the viscosity began to rise remarkably. After 7 hours the ice water bath was removed and stirring was continued as they were for 30 minutes, a yellow solution containing a viscous polyamide acid amine was obtained. A part of the reaction solution was cast on a glass plate and put inside a dryer at 40° C. In one hour, the temperature was raised to 100° C. and the temperature was maintained for 2 hours, a yellow brown transparent tenacious film was obtained. When this film was fitted on a frame and heated at 300° C. for 30 minutes in a reduced-pressure dryer, a yellowish brown accompanied by somewhat red transparent tenacious poly(imide - imidazopyrrolon - imide) copolymer film was obtained. When the hardness of this film was measured by a Vickers hardness tester, it was 3.18 kg./mm.$^2$, namely, the hardness remarkably increased as compared with the hardness of a polyimide film which was 24.1kg./mm.$^2$. When the remnant of the polymerization solution was poured into water to separate a polymer, a fibrous polymer was obtained. After being washed with methanol and acetone, said polymer was dried for 2 days inside a reduced-pressure dryer at 50° C. the inherent viscosity of the obtained polymer was 1.03.

EXAMPLE 7

Using the same apparatus and process as in Example 6, the following 3 components were copolycondensed.

0.661 g. of 3,4,4'-triamino-diphenylether
2.460 g. of 4,4'-diaminodiphenylether
3.330 g. of pyromellitic acid dianhydride, and
75 cc. of dimethylformamide (solvent)

When a produced polyamide acid amine solution was coated on a copper wire having a diameter of 1 mm., dried and heated to dehydrate and ring close. When the enameled wire was wound on the wire itself, it was stable to this winding test. It was same after being heated at 240° C. for 16 hours in the air. The Vickers hardness of this polymer was 29.1 kg./mm.$^2$, which is superior as compared with that of polyimide which was 24.1 kg./mm.$^2$. The inherent viscosity of the polyamide acid amine was 1.20.

EXAMPLE 8

A dry 200 cc. 3-necked flask was charged with 0.992 g. of 4,4'-diaminodiphenyl methane and 1.076 g. of 3,4,4'-triaminodiphenylether to which was added 50 cc. of N-methylpyrrolidone in which said amines were dissolved in an ice water bath. While stirring, 3.222 g. of 3,4,3',4'-tetracarboxybenzophenone dianhydride was added thereto and the mixture was stirred for about 1 hour and the solution became viscous. A copolymer so obtained had an an inherent viscosity of 1.05. A poly(imidoimidazopyrrolon-imide) copolymer film obtained by treating said copolymer as Example 6 was very tenacious.

EXAMPLE 9

Using the same apparatus and process as in Example 6, the following 3 components were copolycondensed.

1.653 g. of 3,4,4'-triaminodiphenylether
2.245 g. of parabis-(4-aminophenoxy)benzene
3.317 g. of pyromellitic dianhydride
70 cc. of dimethylformamide (solvent).

The obtained copolymer solution, when coated on a copper wire having a diameter of 1 mm., dried and heated to dehydrate and close ring, it was stable to its self-winding on the wire itself.

An inherent viscosity of a polyamide acid amine copolymer was 1.30. When a film was made as in Example 6, a yellow brown accompanied by somewhat red color film was obtained, which was a thermally stable film having a tensile strength of 10 kg./mm.$^2$, an elongation of 8% being strong to bending.

EXAMPLE 10

A 1,000 cc. 4-necked flask having a stirrer, a thermometer, a conduit for introducing nitrogen and a discharge conduit was charged with 2.3028 g. of 3,4,4'-triaminodiphenylether and 12.1400 g. of 4,4'-diaminodiphenylether, both of which were dissolved in 450 cc. of N,N-dimethylacetamide and 144 cc. of N-methylpyrrolidone under a nitrogen atmosphere in an ice water bath. The liquid temperature was maintained at 0°–1° C. and with stirring 15.4016 g. of pyromellitic dianhydride powder (not smaller than 80 mesh) was added thereto little by little. The adding time was about 20 minutes, after stirring at said temperature for 3 hours the temperature was raised to room temperature with stirring to complete the reaction. When this polymer solution was concentrated and cast on a glass plate and dried at 90° C., thereafter heated at 300° C. for 30 minutes, a tenacious polyimide-imidazopyrrolonimide film was obtained. When the polymer solution was coated on a copper wire and baked at 300° C., an insulating wire stable to winding on the wire itself was obtained.

EXAMPLE 11

A 3-necked flask equipped with a stirrer, thermometer and a powder funnel was charged with 1.09 g. of pyromellitic dianhydride and 86 g. of m-cresol for industrial use, when the contents were heated at 120° C. for several minutes, a transparent reddish brown homogeneous solution was obtained. Said solution was cooled to 15° C., to which 8.5 g. of 4,4'-diaminodiphenylether and 1.6 g. of 3,4,4'-triaminodiphenylether were added swiftly powderwise from said powder funnel. The powder funnel was cleanly washed with 15 g. of m-cresol. When 7.9 g. of pyridine was slowly added with enough stirring, the polymer solution became a transparent homogeneous solution, becoming viscous gradually. Stirring of the polymer solution for one day at room temperature put an end to the reaction. A transparent, free of gel polyamide acid amine copolymer solution having polymer concentration of 16.2% was obtained, whose viscosity at 30° C. was 590 poise. An inherent viscosity of a polymer obtained by recrystallizing a part of said copolymer from toluene and dried was 0.92. A poly(imide-imidoimidazopyrrolon) copolymer film obtained by casting this polymer solution on a glass plate and by drying and heating at 250° C. for 1 hour was tenacious.

EXAMPLE 12

7.9 g. of 4,4'-diaminodiphenylmethane and 2.8 g. of 3,4,4'-triaminodiphenylsulfone were dissolved in 100 g. of m-cresol for industrial use and the mixed solution was charged in a 3-necked flask equipped with a stirrer, a thermometer and a conduit for introducing nitrogen, to which was added 12.1 of ethylaniline, while keeping the reaction temperature at 20° C. the air inside the flask was substituted by nitrogen, followed by powder-wise slow addition of 11 g. of 3,4,3',4'-tetracarboxybenzophenone dianhydride. After said addition was completed, the flask was immersed in an oil bath at 40–50° C. to proceed the reaction for 6 hours. A transparent homogeneous solution having a polymer concentration of 14% was obtained, whose viscosity at 20° C. was 200 poise. An enameled wire produced by coating this polymer solution on a copper wire having a diameter of 1 mm. and baked was lustered and could endure the winding around a core of the same diameter after being heated at 200° C. for 20 hours in the air.

EXAMPLE 13

A 3-necked flask equipped with a stirrer, a thermometer and a conduit for introducing nitrogen was charged with 5.46 g. of pyromellitic dianhydride, 50 g. of cresol for industrial use and 7 g. of naphtha No. 2, the contents were heated to 120° C. to make them a solution. When a homogeneous solution was obtained, it was cooled to 20° C., added with 4.25 g. of 4,4'-diaminodiphenylether and 0.8 g. of 3,4,4'-triaminodiphenylether and with 12.5 g. of cresol. When 7.5 g. of diethylaniline was slowly added thereto with enough stirring, a transparent viscous polymer solution was obtained. When the polymer solution was left to stand for one day with stirring, a homogeneous solution having a polymer concentration of 12% was obtained, whose viscosity at 20° C. was 380 poise. An inherent viscosity of a polymer obtained by reprecipitating a part of said solution in toluene and drying the same was 0.50. An enameled wire obtained by coating the polymer solution on a copper wire having a diameter of 1 mm. and baking was stable to the winding around a core of the same diameter after heating at 250° C. for 24 hours in the air.

EXAMPLE 14

4.25 g. of 4,4'-diaminodiphenylether and 0.8 g. of 3,4,4'-triaminodiphenylether were dissolved in 50 g. of m-cresol, the solution was charged in a 3-necked flask equipped with a stirrer, a thermometer and a conduit for introducing nitrogen, to which 6.5 g. of quinoline was added. With enough stirring 5.46 g. of pyromellitic dianhydride was added thereto in 2 hours. The remaining powder was washed with 20.5 g. of m-cresol and charged in the flask. Thereafter, when the flask was immersed in an oil bath at 40–50° C. and heated for 6 hours with stirring, a transparent homogeneous polymer solution having a very high viscosity was obtained, An inherent viscosity of a polymer obtained by re-precipitating a part of this solution in toluene and drying the precipitate was 1.26. When this polymer solution was cast on a glass plate, dried, heated at 240° C. for 1 hour to close the ring, a tenacious film of a poly(imide-imidoimidazopyrrolon) copolymer was obtained. An enameled wire obtained by coating this polymer solution on a copper wire having a diameter of 1 mm. and baking was stable to the winding around a core of the same diameter after it was heated at 250° C. for 24 hours in the air.

EXAMPLE 15

A polymerization was carried out same as in Example 13 except diisopropylamine was used instead of diethylaniline. The viscosity of the polymer solution at 20° C. was 127 poise. An inherent viscosity of a polymer ob-

EXAMPLE 16

2.70 g. of methaphenylenediamine and 5.38 g. of 3,4,4′-triaminodiphenylether were dissolved in 80 g. of mixed cresol for industrial use and the solution was charged in a flask equipped with a stirrer, a thermometer and a triangular funnel, to which was added 16.3 g. of N,N-diethyl-p-toluidine. While keeping the temperature at 15° C. with enough stirring, 15.4 g. of tetracarboxydiphenylether dianhydride was slowly added thereto through the triangular funnel and the funnel was well washed with 28.3 g. of mixed cresol and charged into the flask. Thereafter, when stirring was continued for one day at room temperature, a transparent polymer solution was obtained. The viscosity of the solution whose polymer concentration was 12% was 350 poise at 20° C. The inherent viscosity of the polymer was 0.6. It was possible to cast this polymer solution on a glass plate and make a poly(imide-imidoimidazopyrrolon) copolymer film.

EXAMPLE 17

A 3-necked flask equipped with a stirrer, a thermometer and a conduit for introducing nitrogen was charged with 10.9 g. of pyromellitic dianhydride and 60 g. of m-cresol for industrial use and the former was dissolved in the latter with heating. After they become a homogeneous transparent solution, it was cooled and added with 7.92 g. of 4,4′-diaminodiphenylmethane and 2.15 g. of 3,4,4′-triaminodiphenylether and the measuring container was washed with 16 g. of m-cresol. To the mixture, 18.5 g. of tri-n-butylamine was added in 30 minutes with enough stirring. After the addition was completed, the flask was heated at 40–50° C. for 8 hours. A transparent polymer solution was obtained, whose viscosity at 20° C. was 250 poise. In this polymer solution, glass fiber was immersed, and heat set, and a laminate was obtained. The inherent viscosity of the polymer was 0.43.

EXAMPLE 18

A 3-necked flask equipped with a stirrer, a thermometer and a conduit for introducing nitrogen was charged with 10.9 g. of pyromellite dianhydride and 60 g. of mixed cresol for industrial use, and the former was dissolved in the latter with heating 8.5 g. of 4,4′-diaminodiphenylether and 1.6 g. of 3,4,4′-triaminodiphenylether were dissolved in 60 g. of mixed cresol for industrial use, and the resultant solution was added slowly to said cresol solution of anhydrous pyromellitic acid while keeping the temperature at 20° C. A while after completion of the addition, the mixed solution became opaque. When 12.1 g. of N,N-dimethylaniline was gradually added to said mixed solution, a transparent solution was obtained. When this solution was stirred at room temperature for one day, a viscous polymer solution was obtained, whose viscosity at 20° C. was 300 poise and the inherent viscosity of the polymer was 0.5. From this polymer solution, a tenacious film was obtained.

EXAMPLE 19

A 500 cc. 4-necked flask was equipped with a stirrer, a thermometer, a conduit for introducing nitrogen and a discharge conduit. Said flask was charged with 173 cc. of N-methylpyrrolidone, 133 cc. of N,N-dimethylacetamide, 50 cc. of naphtha No. 2 and 3.5 cc. of water, and the contents were well mixed, to which were added 2.3030 g. of 3,4,4′-triamino-diphenyl and 12.1400 of 4,4′-diamino-diphenylether, and they were dissolved in the mixture under a nitrogen gas stream. When the mixed solution was added with 15.4000 g. of powdered pyromellitic dianhydride little by little in 10 minutes, a polymerization started immediately and the viscosity raised. After about 1 hour, the powder of acid anhydride completely dissolved, and after 3 hours, the kinematic viscosity of the polymer solution became about 3.7 stokes. During the period, the temperature was maintained at 0–1° C. and stirring was continued.

A part of a polyamide acid amine solution so obtained was poured dropwise into toluene to isolate a fibrous polymer. When the fibrous polymer was sufficiently dried and the inherent viscosity thereof was measured, it was 1.25.

The polymer solution was stably stored without displaying a gelating phenomenon. Said solution was coated on a copper wire having a diameter of 1 mm., heated at 200–300° C., dried and closed the ring, and the obtained enameled copper wire was stable to the winding around a core of the same diameter after being heated at 240° C. for 16 hours.

EXAMPLE 20

(A) A 500 cc. 4-necked flask was set as in Example 19, charged with 355 cc. of N,N-dimethylacetamide added with 36 cc. of water in which 1.919 g. of 3,4,4′-triamidodiphenylether and 10.11 g. of 4,4′-diaminodiphenylether were dissolved. While stirring at 0° C. said mixed solution was added with 12.964 g. of pyromellitic dianhydride little by little. After completion of the addition, stirring was continued at 0–1° C. After 3 hours, the kinematic viscosity of the polymer solution reached 98 stokes and an inherent viscosity of an isolated polyamide acid amine was 1.55.

An enameled copper wire prepared by coating this polymer solution, followed by the treatment (350° C.) of said wire, was stable to the winding around a core of the same diameter. This polymer solution was divided into two, one was stored at about 2° C. and the other was stored at about 20° C. for 15 days, respectively. What was maintained at about 20° C. lowered in its viscosity to about 60 stokes, however, what was stored at about 2° C. showed no change. Enameled copper wire prepared by using these two solutions after storage were stable to the winding around cores of the same diameter.

(B) For the purpose of comparison, the following experiment was carried out.

A 300 cc. 4-necked flask was set as in Example 19, charged with 160 cc. of N,N-dimethylacetamide in which 1.226 g. of 3,4,4′-triaminodiphenylether and 4.562 g. of 4,4′-diaminodiphenylether were dissolved in the absence of water, to which mixed solution, 6.192 g. of pyromellitic acid dianhydride was added little by litle at 0° C. The kinematic viscosity of the polymer solution after stirring at 0–1° C. for 3 hours was, same as in said (A), 98 stokes.

An enameled copper wire prepared by using said solution immediately after completion of the polymerization was stable to the winding around a core of the same diameter.

Same as the experiment in said (A), when the polymer solution was divided into two, one was stored at 2° C. and the other was stored at 20° C., what was stored at 20° C. completely gelated after 10 days and what was stored at 2° C. also remarkably gelated after 15 days and it was impossible to dilute the gelated polymer with N,N-dimethylacetamide.

EXAMPLE 21

A 500 cc. 4-necked flask was set as in Example 19, and charged with 355 cc. of N,N-dimethylacetamide added with 3.6 cc. of water in which 1.919 g. of 3,4,4′-triaminodiphenylether and 10.116 g. of 4,4′-diaminodiphenylether, to which 12.925 g. of pyromellitic dianhydride was added little by little with stirring at 10° C. to initiate a polymerization. Next, when the solution was stirred at 20° C. for 3 hours, the kinematic viscosity of the solution reached 17.6 stokes. An enameled copper wire prepared from said solution was stable to the winding around a core of the same diameter.

EXAMPLE 22

By the process same as in Example 21, 2 kinds (anhydrous and water-containing) of a polyamide acid amine solution were obtained from the following charging amounts.

(A)

| | |
|---|---|
| 3,4,4'-triaminodiphenylether _____ g__ | 0.7676 |
| 4,4'-diaminodiphenylether _____ g__ | 4.0466 |
| Pyromellitic dianhydride _____ g__ | 5.1333 |
| Solvent: | |
|    N-dimethylacetamide _____ cc__ | 58 |
|    N,N-dimethylacetamide _____ cc__ | 45.4 |
|    Naphtha No. 2 _____ cc__ | 17 |

(B)

| | |
|---|---|
| 3,4,4'-triaminodiphenylether _____ | (¹) |
| 4,4'-diaminodiphenylether _____ | (¹) |
| Pyromellitic dianhydride _____ | (¹) |
| Solvent: | |
|    N-methylpyrrolidone _____ cc__ | 58 |
|    N,N-dimethylacetamide _____ cc__ | 44.3 |
|    Naphtha No. 2 _____ cc__ | 17 |
|    Water _____ cc__ | 1.2 |

¹ Same as in A.

When the solutions (A) and (B) were concentrated under a reduced pressure at 50° C., the solution (A) brought about gels halfway and did not give a good varnish. The solution (B) was concentrated about 2 times without gelating and an enameled copper wire prepared therefrom was stable to the winding around a core of the same diameter.

EXAMPLE 23

3.438 g. of 4,4'-diaminodiphenylether and 0.632 g. of 3,4,4'-triaminodiphenylether were dissolved in 25.5 g. of N,N-dimethylacetamide, and the mixed solution was charged in a 3-necked flask equipped with a stirrer, a thermometer and a dropping funnel. The flask was immersed in a water bath at 20° C. and while the contents were stirred, a solution dissolving 4.362 g. of pyromellitic dianhydride in 51 g. of acetone was added thereto. A transparent, free of gel, polyamide acid amine having a polymer concentration of 10% was obtained, whose viscosity at 20° C. was 6.0 stokes. An inherent viscosity of a polymer obtained by re-precipitating a part of said polymer in toluene and drying the precipitate was 0.95. A polyamide-imidoimidazopyrrolon copolymer film obtained by casting said polymer on a glass plate, drying and heating at 250° C. for 1 hour had a large elongation of 44% being very tenacious. And it was recognized that an inherent viscosity of a polymer produced by dissolving anhydrous pyromellitic acid in N,N-dimethylacetamide and carrying out the similar reactions was somewhat lower than 0.5.

EXAMPLE 24

35.74 g. of 3,4,4'-triaminodiphenylether and 6.781 g. of 4,4'-diaminodiphenylether were dissolved in 216 g. of N,N-dimethylacetamide, to said mixed solution 0.54 g. of water was added, and the entire mixture was charged in a 3-necked flask having a stirrer, a thermometer and a dropping funnel. The flask was immersed in an ice water bath, and while stirring the contents, a solution dissolving 45.21 g. of pyromellitic dianhydride in 324 g. of γ-butylolactone was gradually dropped to the flask through the dropping funnel.

Keeping the rise of the temperature below 5° C., when the dropping was completed, a transparent solution whose polymer concentration was 14% was obtained, whose viscosity being 95 stokes. An inherent viscosity of a polymer obtained by re-precipitating a part of said polymer in toluene and drying the precipitate was 1.20, and a polyimide-imidazopyrrolon copolymer film obtained by casting the polymer on a glass plate, drying and heating at 250° C. for 30 minutes was very tenacious.

An enameled wire prepared coating the polymer solution to a copper wire and baking was endurable to the winding around a core of the same diameter after being heated at 250° C. for 24 hours in the air.

EXAMPLE 25

10.116 g. of 4,4'-diaminodiphenylether and 1.919 g. of 3,4,4'-triaminodiphenylether were dissolved in a solvent of 70 g. of N,N-dimethylacetamide and 100 g. of N-methylpyrrolidone, to which was added 1.75 g. of water, while cooling the mixture to 0° C. with stirring, a solution dissolving 12.964 g. of pyromellitic dianhydride in 180 g. of tetrahydrofuran was poured dropwise into said mixture. The dropping speed was adjusted to keep the temperature of the reaction solution at 10° C. After 2 hours, the kinematic viscosity of the reaction solution became 3 stokes. When a part of the reaction solution was poured into toluene and the inherent viscosity of the polymer was measured to be 0.98. It was possible to obtain a tenacious polyimide-imidoimidazopyrrolon copolymer film by casting a polymer solution having a high concentration obtained by distilling off tetrahydrofuran from the reaction solution. An enameled wire prepared by applying said polymer solution of a high concentration and baking was stable to the winding around a core of the same diameter after being heated at 250° C. for 24 hours in the air.

EXAMPLE 26

2.014 g. of 3,4,4'-triaminodiphenylether was dissolved in 34.6 g. of N,N-dimethylacetamide, the mixed solution was charged in a 3-necked flask having a dropping funnel, a stirrer and a thermometer. Said flask was immersed in an ice water bath and a solution dissolving 3.010 g. of pyromellitic dianhydride in 34.6 g. of γ-butylolactone was poured dropwise into said mixed solution through the dropping funnel with stirring. Within 1 hour after dropping of the total amount, the viscosity of the solution reached 3.7 stokes at 20° C. When a part of the solution was poured into toluene and the inherent viscosity was measured by isolating a polyamide acid amine, to be 1.23. When the remnant of the solution was cast on a glass plate, dried and heated at 240° C. for 1 hour, a red polyimido-imidazopyrrolon film was obtained.

EXAMPLE 27

A 300 cc. 4-necked flask was equipped with a stirrer, a thermometer, a conduit for introducing nitrogen and a discharge conduit. The flask was charged with 0.045 mol of well purified and dried 3,4,4'-triaminodiphenylether and 0.055 mol of well purified and dried 1,3-bis-(4'-aminophenoxy) benzene, under a nitrogen atmosphere a 1:4 mixed solution of N,N-dimethylacetamide and N-methylpyrrolidone was added to said amines in an ice water bath so that concentration of the final polymer might become 10%, and the former two were dissolved in the latter mixed solution. While the resultant solution was well stirred, 0.98 mol of powder of pyromellitic dianhydride was added to said solution in 10–30 minutes. After a reaction was carried out for about 30 minutes, 0.03 mol of pyromellitic dianhydride dissolved in 10 times amount of N,N-dimethylacetamide was very slowly added to the reaction solution. The viscosity of the produced polymer was gradually increased. At a proper time thereof, addition was stopped. The adding amount by that time was normally 0.0005–0.0015 mol. At the same temperature, stirring was continued for 2–3 hours, further, stirring was continued for 2–3 hours at room temperature and the reaction was completed. The inherent viscosity of a polyamide acid amine so obtained was 0.60–0.95.

The polymer solution was cast on a glass plate, dried at 60–80° C. for 8–20 hours, followed by heating at 250° C. for 1 hour. As a result, a tenacious polyimide-imidazopyrrolon copolymer film was obtained. The tensile strength thereof was 13–16 kg./mm.² and the elongation was 35%. When this film was heated at a rate of 10° C./min. to test its thermal stability, it was confirmed that at about 490° C. the thermal decomposition of the polymer began.

EXAMPLE 28

In Example 27, instead of 1,3-bis(4'-aminophenoxy) benzene, 4,4'-diaminodiphenylmethane was used and instead of pyromellitic dianhydride, 1,2,3,4 - butanetetracarboxylic acid dianhydride was used in carrying out the similar reaction. However, the acid anhydride was added as solid powder in an amount of 0.1 mol in 10–20 minutes, and after the reaction was over, the produced reaction mixture was left to stand overnight. The inherent viscosity of a polyamide acid amine so obtained was 1.02.

This polymer was applied to a glass fabric of 70 microns wide, dried at 90° C. and heated by a heating press at 220° C. under a pressure of 100 kg./cm.$^2$ for 20 minutes. The glass fabric laminate obtained by overlapping 10 such glass fabrics has a bending strength of 30 kg./cm.$^2$.

It was possible to insert said fabric impregnated with a polyamide acid amine dried at 90° C. as mentioned above between various metals to strongly adhere the metals by heat pressing at 250° C. For instance, in a 10 mm. laminate of stainless steel plate (1.5 x 25 x 150 mm.), the tensile strength at breakage was 230 kg./cm.$^2$. In the case of aluminum, it was 170 kg./cm.$^2$.

EXAMPLES 29–42

Except using combinations of an acid anhydride, a diamine and a triamine illustrated in the following table, reactions were carried out as in Example 27. The polymerization degrees of the obtained polyamides acid/polyamide acid amine copolymers were shown by inherent viscosities $\eta_{inh}$ in the following table.

EXAMPLE 44

11.347 g. of 4,4'-diaminodiphenylether and 2.152 g. of 3,4,4'-triaminodiphenylether were dissolved in 80 g. of dimethylacetamide, a solvent, to the mixed solution of 2.4 g. of water was added. At room temperature with stirring 14.831 g. of pyromellitic acid dianhydride was dissolved in 160 g. of dimethylacetamide whose water content being 150 p.p.m., when the solution so obtained was added to the foregoing solution in 20 seconds, the reaction temperature immediately rose from 23° C. to 35° C. and in a little while began to lower. Stirring was carried out for 2 hours as it was. The inherent viscosity of the polymer after completion of the reaction was 0.61.

A copper wire of diameter of 0.95 mm. was coated with the reaction solution, which was baked by an electric furnace at 230° C. Repeating this procedure for 8 times and an enameled wire whose thickness was 0.041 mm. was obtained. When this enameled wire was wound around the same enameled wire, it did not peel off. When the enameled wire was wound around the same enameled wire after being heated inside a ventilating dryer at 240° C. for 16 hours, no peeling off was observed.

EXAMPLE 45

Except reacting 0.03 mol of 3,4,4'-triaminodiphenylether with 0.07 mol of 1,3-bis(4'-aminophenoxy)benzene, by carrying out a reaction as in Example 27, a polyamide acid-polyamide acid amine having an inherent viscosity of 0.91 was obtained. The polyamide acid solution so obtained was cast on a glass plate, dried overnight at 60° C.

| Ex. | Acid dianhyd. (mol) | Diamine (mol) | Triamine (mol) | $\eta_{inh}$ |
|---|---|---|---|---|
| 29 | Pyromellitic acid dianhydride (0.098+0.0007). | 3,4'-diaminodiphenylether (0.07) | 3,4,4'-triaminodiphenylether (0.03) | 0.81 |
| 30 | Pyromellitic acid dianhydride (0.098+0.0011). | 3,4'-diaminobenzanilide (0.07) | do | 0.97 |
| 31 | 3,4,3',4'-diphenylethertetracarboxlic acid dianhydride (0.098+0.0014). | 3,4'-diaminodiphenylether (0.07) | 3,4,4'-triaminodiphenylether (0.03) | 1.10 |
| 32 | 3,4,3',4'-diphenylethertetracarboxylic acid dianhydride (0.098+0.0008). | 4,4'-diaminodiphenylthioether (0.07) | do | 0.89 |
| 33 | 3,4,3',4'-benzophenontetracarboxylic acid dianhydride (0.098+0.0012). | 4,4'-diaminodiphenylmethane (0.08) | 3,4,4'-triaminodiphenylether (0.02) | 0.94 |
| 34 | 1,2,3,4-cyclopentanetetracarboxylic acid dianhydride (0.097+0.0009). | 1,3-bis(4-aminophenoxy)benzene (0.08). | do | 0.86 |
| 35 | 3,4,3',4'-diphenylethertetracarboxylic acid dianhydride (0.098+0.008). | 1,3-bis(4-aminophenoxy)benzene (0.07). | 3,4,4'-triaminobenzophenone (0.03) | 0.89 |
| 36 | 3,4,3',4'-diphenylethertetracarboxylic acid dianhydride (0.098+0.011). | do | 3-aminobenzidine (0.03) | 0.93 |
| 37 | 3,4,3',4'-diphenylethertetracarboxylic acid dianhydride (0.098+0.011). | 1,3-bis(4-aminophenoxy)benzene (0.08). | 3,4,4'-triaminodiphenylthioether (0.02) | 0.87 |
| 38 | 3,4,3',4'-diphenylethertetracarboxylic acid dianhydride (0.098+0.009). | 4,4'-diaminobenzophenone (0.06) | 3,4,4'-triaminobenzanilide (0.04) | 0.82 |
| 39 | Pyromellitic acid dianhydride (0.098+0.011). | 4,4'-diaminodiphenylether (0.08) | 3,4,4'-triaminodiphenylmethane (0.02) | 0.89 |
| 40 | Pyromellitic acid dianhydride (0.098+0.01). | 4,4'-diaminodiphenylether (0.07) | 1-(3',4'-diaminophenoxy)-4-(4''-diaminophenoxy)benzene (0.03). | 0.93 |
| 41 | 2,2-diphenyl-propane-3,4,3',4'-tetracarboxylic acid dianhydride (0.098+0.01). | 4,4'-diaminodiphenylether (0.08) | 1,2,4-triaminobenzene (0.02) | 0.85 |
| 42 | 1,4-bisphenoxybenzene-3',4',3'',4''-tetracarboxylic acid dianhydride (0.098+0.013). | m-Phenylenediamine (0.08) | 3,4,4'-triaminodiphenylether (0.02) | 0.88 |

The solutions of the copolymers so obtained were cast on glass plates, the solvents were vaporized at 70° C. under a reduced pressure, continuously they were dehydrated to close rings at 250° C. and films of 10–20 microns wide could be made.

EXAMPLE 43

5.447 g. of 4,4'-diaminodiphenylether and 1.033 g. of 3,4,4'-triaminodiphenylether were disolved in a mixed solvent of 95.5 g. of N-methylpyrrolidone, 47.8 g. of dimethylformamide, 23.9 g. of solvent naphtha No. 2 and 1.7 g. of water, the mixed solution was heated at 70° C. and stirred in a hot bath. When the mixed solution was added with 8.620 g. of pyromellitic acid dianhydride in 5 seconds, the temperature of the solution rose to 79° C. Stirring was carried out as it was for 1 hour, the heating bath was removed and the temperature dropped to room temperature. A polymer was separated from the reaction solution by using xylene as a precipitant, the polymer was dried and disolved in N-methyl-2-pyrrolidone and the inherent viscosity so measured was 0.48. The ring-closed film obtained from said reaction solution has a tensile strength of 8.2 kg./mm.$^2$ and an elongation of 24%.

and heated at 250° C. for 1 hour to close the ring. The result of the tensile test of the obtained film of 70 microns thick was a tensile strength of 14 kg./mm.$^2$ and an elongation of 60%. This solution was coated on a copper wire of a diameter of 1 mm. and baked by a furnace at 230° C. Repetition of this operation for about 10 times brought about an enameled copper wire having a film thickness of 30 microns. This enameled copper wire, when heated to 250° C. for 24 hours in the air, did not peel off even when it is wound around the same enameled copper wire. In an abrasion-resistant test under a load of 600 g., the abrasion-resistant frequency was about 60 times.

In contrast to the foregoing, with reference to a polyamide acid having an inherent viscosity of 1.12 obtained by reacting 0.1 mol of 1,3-bis(4'-aminophenoxy)benzene not including any triamine only with 0.099 mol of pyromellitic acid dianhydride, in the operations same as mentioned above, a film and an enameled wire were attempted to be made, however, the polymer was so brittle that no good film and enameled wire were obtainable.

EXAMPLE 46

5.146 g. of 4-acetamido-3',4-diaminodiphenylether and 4.362 g. of pyromellitic dianhydride were charged in a 300 cc. 3-necked flask, to which was added 80 ml. of purified and dried N-methylpyrrolidone, and the three compounds were stirred in an ice water bath. Immediately, a reaction started and the temperature of the solution began to rise and the viscosity of the reaction solution gradually rose even after the three compounds are homogeneously dissolved. After stirring was continued for about 3 hours after the solvent was added, stirring was stopped and the reaction solution was left to stand overnight, a part of said solution was taken and diluted with N-methylpyrrolidone added so that 0.5 g. of a polymer might contain in 100 ml. of the solvent, and when the inherent viscosity was measured, it was 0.92. When this viscous light yellowish polyamide solution was cast on a glass sheet and the solvent was removed in a dryer at 80° C., a tenacious light brownish film was obtained. When this film was fitted on a frame, heated at 100° C. under a reduced pressure of 3 mm. Hg for 30 minutes, the temperature was gradually raised and made 300° C. in 1 hour, the film was kept at 300° C. for 1 hour and left to cool, and when the film was taken out, a red tenacious transparent polyimidoimidazopyrrolon film was obtained.

EXAMPLE 47

A 50 cc. reaction flask was charged with 5.146 g. of 4-acetamido-3',4-diaminodiphenylether, to which was added 70 ml. of N-methylpyrrolidone under a nitrogen gas current, the former was dissolved in the latter, the solution was cooled to 0° C. in an ice water bath, thereafter 4.363 g. of pyromellitic dianhydride was added to the solution little by little. The pyromellitic dianhydride adhered to the funnel used was washed with 10 ml. of the solvent and flown in. Immediately, a reaction started and the temperature rose. When dissolution was completely effected, the temperature of the reaction solution dropped to 0° C., however, the viscosity of the reaction gradually rose. When a part of light yellow viscous solution so obtained was taken, diluted to a proper concentration with N-methylpyrrolidone, thereafter poured into water and washed well by using a small mixer, a white fibrous polyamide was obtained. The polyamide was washed well with water, thereafter washed with methanol, dried inside a reduced-pressure dryer at 60° C. for 24 hours, and dissolved in concentrated sulfuric acid, the inherent viscosity so sought was 0.21. When the polymer soution was cast on a glass sheet, dried in a ventilating dryer at 80° C., thereafter the solution was transferred to a reduced-pressure dryer, the temperature was gradually raised, the temperature was kept at 300° C. for 40 minutes, thereafter taken out and immersed in water and a film was removed from the glass plate, a transparent tenacious film of a polymer containing a hetero ring was obtained. The tensile strength of the film was 11 kg./cm.$^2$.

EXAMPLE 48

2.143 g. of 4-formamido-3,4'-diaminodiphenylethane was dissolved in 50 ml. of dimethylacetamide, the solution was added with 3.222 g. of 3,4,3',4'-tetracarboxybenzophenone dianhydride. A part of the obtained viscous polyamide solution was taken, diluted with dimethylacetamide to make the concentration 0.5 g./100 ml. and the viscosity was measured at 30° C. The inherent viscosity was 0.88.

On a copper wire of a diameter of 1 mm. annealed according to the conventional method, the polyamide solution was coated and baked at 200° C. for 7 times, thereafter the cable was heated to 300° C., and a blood red enameled wire was obtained.

EXAMPLE 49

In an Erlenmeyer flask, 1-acetamide-2,4-diaminobenzene was dissolved in hexamethylene phosphoramide. The flask was immersed in a water bath at 50° C. and while the content was stirred by a magnetic stirrer, an equimolar amount of pyromellitic dianhydride dispersed in a 7:3 mixed solution of N-methylpyrrolidone and acetone was added into the flask little by little in 10 minutes. After stirring for 2 hours, the mixture was left to stand overnight at room temperature, thereafter when a film was prepared on a glass plate according to the conventional method, a blood orange transparent polyimidoimidazopyrrolon film was obtained. The inherent viscosity of the polyamide intermediate in N-methylpyrrolidone was 1.03.

EXAMPLE 50

2.156 g. of 1-propionamido-2,6-diamino-3,4-dimethylhexane and 3.363 g. of 2,2-bis(2',3'-dicarboxyphenyl) propane dianhydride were dissolved in 50 ml. of dimethylformamide, and while cooling with a bath at −10° C. the solution was stirred under a nitrogen gas current for 10 hours. To the reaction mixture, a pyridine dianhydrous acetic acid mixture was added, after stirring at 100° C., a polymer was separated, heated at 250° C. under a pressure of 1 mm. Hg for 2 hours, and pink blood rigid polyimidoimidazopyrrolon powder was obtained.

EXAMPLE 51

An equimolar mixture of 2-(4'-acetamido-3-aminophenyl)-6-aminobenzooxazole and pyromellitic acid dianhydride was dissolved in N-methylpyrrolidone, and the solution was stirred at room temperature for 3 hours. The reactants were added with toluene to separate, a polymer, which was washed with methanol and acetone, thereafter dried at 60° C. under a pressure of 0.5 mm. Hg for 24 hours.

The inherent viscosity of the produced polyamide measured in concentrated sulfuric acid was 0.31. When the polyamide was heated at 300–350° C. in nitrogen for 30 minutes, a polymer stable at 400° C. in the air was obtained.

EXAMPLE 52

2.153 g. of 1-acetamido-2,5-diaminonaphthalene and 5.146 g. of 4-acetamino-3,4'-diaminodiphenylether were charged in a 500 cc. blender, to which was added 150 ml. of N-methylpyrrolidone was added and the mixture was violently stirred. To the mixture 6.544 g. of pyromellitic dianhydride was added little by little and the temperature was kept below 40° C. When a completely homogeneous solution was obtained, the blender was transferred into a reduced-pressure desiccator and left to stand overnight to defoam. When this polyamide solution was cast on a glass plate, heated inside a ventilating dryer at 100° C. for 30 minutes, followed by gradual raising of the temperature to 130° C., dried at said temperature for 30 minutes, thereafter taken out and a film was peeled off from the glass plate, fitted on a frame, put inside a reduced-pressure dryer and the temperature was raised to 350° C. in 2 hours, thereafter said temperature was maintained for 30 minutes, left to cool to 200° C. and taken out, a transparent tenacious film was obtained, which was insoluble in all the organic solvent attempted.

EXAMPLE 53

By carrying out a reaction same as in Example 48, from 4-acetamido - 3,4' - diaminodiphenylsulfone and 1,2,4,5-tetracarboxycyclohexane dianhydride, a polyamide intermediate whose inherent viscosity measured in N-methylpyrrolidone was 0.42 was obtained. When this intermediate was heated at 300° C. under a reduced pressure for 40 minutes, a polymer containing a hetero ring stable at 300° C. in the air was obtained.

EXAMPLES 54–60

Copolymerizations were carried out as in Examples 29–42; however, the respective mixtures were used in mol numbers described in the following table and degrees of polymerization of these copolymers were shown as inherent viscosities, $\eta_{inh}$. These copolymers were cast on glass plates, the solvents were vaporized at 70° C., subsequently dehydrated at 250° C. under a reduced pressure and films of 10–20 microns thick were obtained.

| Ex. | Dianhydride (mol) | Diamine (mol) | Triamine (mol) | $\eta_{inh}$ |
|---|---|---|---|---|
| 54 | Pyromellitic (0.098+0.0008) | Metaphenylenediamine (0.04) plus 3,4'-diaminodiphenylether (0.04). | 3,4,4'-triaminodiphenylether (0.02) | 0.87 |
| 55 | Pyromellitic (0.04) plus 3,4,3',4'-tetracarboxydiphenylether dianhydride (0.058+0.0011). | 4,4'-diaminodiphenylether (0.07) | 3,4,4'-triaminodiphenylether (0.03) | 0.88 |
| 56 | 3,4,3',4'-tetracarboxyldiphenylether dianhydride (0.05) plus 1,2,3,4-butanetetracarboxylic dianhydride (0.05). | ___do___ | ___do___ | 0.72 |
| 57 | 1,2,3,4-butanetetracarboxylic dianhydride (0.1005). | 4,4'-diaminodiphenylether (0.04) plus 4,4'-diaminodiphenylmethane (0.04). | 3,4,4'-triaminodiphenylether (0.02) | 0.83 |
| 58 | ___do___ | 4,4'-diaminodiphenylether (0.02) plus 1,6-diaminohexane (0.06). | ___do___ | 0.75 |
| 59 | 1,2,3,4-butanetetracarboxylic dianhydride (0.100). | 1,4-diaminonaphthalene (0.04) | 3,4,4'-triaminodiphenylether (0.02) plus 3,4,4'-triaminobenzanilide (0.04). | 0.72 |
| 60 | 3,4,3',4'-tetracarboxyldiphenylether (0.098+0.001). | 4,4'-diaminodiphenylether (0.04) plus 1,3-bis(4-aminophenoxy)benzene (0.03). | 1,2,6-triaminonaphthalene (0.03) | 0.76 |

EXAMPLES 61–69

Polymerizations were carried out as in Example 29; however, the respective mol numbers used were as described in the following table. Degrees of polymerization of these polymers were shown as inherent viscosities, $\eta$ inh. By finally dehydrating these polymers at 250° C. under a reduced pressure, films of 10–20 microns thick could be obtained.

| Ex. | Dianhydride (mol) | Diamine (mol) | Triamine (mol) | $\eta_{inh}$ |
|---|---|---|---|---|
| 61 | 3,4,3',4'-tetracarboxydiphenylether dianhydride (0.098+0.0011). | 4,4-diaminodiphenylether (0.08) | 1,2,6-triaminonaphthalene (0.02) | 0.82 |
| 62 | 3,4,3',4'-tetracarboxydiphenylether dianhydride (0.098+0.0009). | 1,4-diaminonaphthalene (0.08) | 3,4,4'-triaminodiphenylether (0.02) | 0.78 |
| 63 | 3,4,3',4'-tetracarboxydiphenylether dianhydride (0.098+0.001). | 1,6-diaminohexane (0.08) | ___do___ | 0.72 |
| 64 | ___do___ | 1,4-diaminocyclohexane (0.08) | ___do___ | 0.69 |
| 65 | 1,2,3,4-butanetetracarboxylic dianhydride (0.10). | 1,6-diaminohexane (0.08) | ___do___ | 0.58 |
| 66 | 3,4,3',4'-tetracarboxydiphenylether dianhydride (0.098+0.001). | 4,4'-diaminodiphenyl-N-methylamine (0.08) | 3,4,4'-triaminodiphenylether (0.02) | 0.79 |
| 67 | 3,4,3',4'-tetracarboxydiphenylether dianhydride (0.098+0.0011). | 4,4'-diaminotriphenylamine (0.08) | ___do___ | 0.82 |
| 68 | 3,4,3',4'-tetracarboxydiphenylether dianhydride (0.098+0.001). | 4,4'-diaminodiphenylether (0.08) | 3,4,4'-triamino-N-methylamine (0.02) | 0.77 |
| 69 | 3,4,3',4'-tetracarboxydiphenylether dianhydride (0.098+0.0009). | ___do___ | 3,4,4'-triaminotriphenylamine (0.02) | 0.75 |

What is claimed is:

1. A thermally stable film forming polymer consisting essentially of the recurring structural unit of the general formula

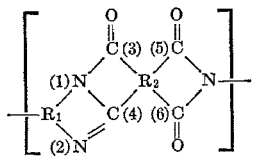

wherein $R_1$ stands for a trivalent aromatic radical which is selected from the group consisting of a trivalent benzene ring, a trivalent naphthalene ring, a radical of the formula

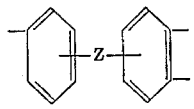

wherein Z is selected from the group consisting of a direct bond between two benzene rings, an alkylene having from 1 to 3 carbon atoms, —O—, —S—, —SO$_2$—, —CO—, —NR— (wherein R is an alkyl having 1 to 4 carbon atoms or a benzenoid aryl group) —CONH—, and

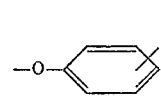

and a trivalent heterocyclic ring, $R_2$ is a tetravalent organic radical selected from the group consisting of a tetravalent butane radical, a tetravalent cyclopentane radical, a tetravalent cyclohexane radical, a tetravalent benzene ring, a tetravalent naphthalene ring and a ring of the formula wherein Z is selected from the group consisting of a direct bond between the two benzene rings, an alkylene having from 1 to 3 carbon atoms, —O—, —S—, —SO$_2$, —CO—, —NR— (wherein R is selected from the group consisting of an alkyl having from 1 to 4 carbon atoms or a benzenoid aryl group), —CONH, and bonds (1) and (2) bond two adjacent carbon atoms in the radical $R_1$ and bonds (3) and (4) which are the same as bonds (5) and (6) individually bond two adjacent carbon atoms in the radical $R_2$.

2. A thermally stable film forming polymer consisting essentially of the recurring unit having the general formula

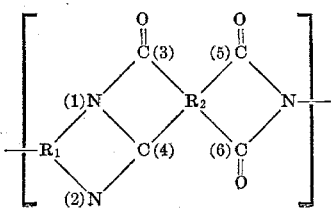

(I)

wherein $R_1$ stands for a trivalent aromatic radical which is selected from the group consisting of a trivalent benzene ring, a trivalent naphthalene ring, a radical of the formula

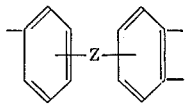

where Z is selected from the group consisting of a direct bond between two benzene rings, an alkylene having from 1 to 3 carbon atoms, —O—, —S—, —SO$_2$,— —CO—, —NR— (wherein R is an alkyl having 1 to 4 carbon atoms or a benzenoid aryl group), —CONH—, and

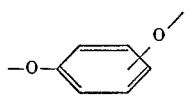

and a trivalent heterocyclic ring, $R_2$ is a tetravalent organic radical selected from the group consisting of a tetravalent butane radical, a tetravalent cyclopentane radical, a tetravalent cyclohexane radical, a tetravalent benzene ring, a tetravalent naphthalene ring and a ring of the formula

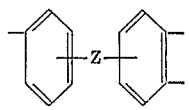

wherein Z is selected from the group consisting of a direct bond between the two benzene rings, an alkylene having from 1 to 3 carbon atoms, —O—, —S—, —SO$_2$,— —CO—, —NR— (wherein R is selected from the group consistsing of an alkyl having from 1 to 4 carbon atoms or a benzenoid aryl group), —CONH—, and

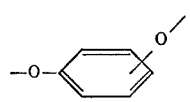

bonds (1) and (2) are bonded to adjacent carbon atoms in the radical $R_1$ and bonds (3) and (4) as well as bonds (5) and (6) are bonded to adjacent carbon atoms in the radical $R_2$; and the recurring unit of the general formula

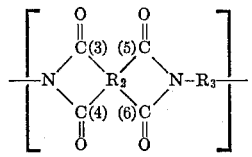

(II)

wherein $R_2$ and bonds (3), (4), (5) and (6) have the same meanings as defined above, and $R_3$ stands for a divalent organic radical having 2–18 carbon atoms.

3. A polymer according to claim 2 containing 5–80 mol percent of the recurring unit of the Formula I and 20–95 mol percent of the recurring unit of the Formula II.

4. A film forming polyamide acid amine consisting of a recurring unit of the formula

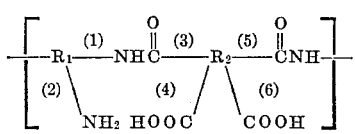

wherein $R_2$ stands for a trivalent aromatic radical which is selected from the group consisting of a trivalent benzene ring, a trivalent naphthalene ring, a radical of the formula

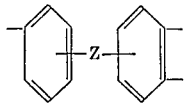

wherein Z is selected from the group consisting of a direct bond between two benzene rings, an alkylene having from 1 to 3 carbon atoms, —O—, —S—, —SO$_2$—, —CO—, —NR— (wherein R is an alkyl having 1 to 4 carbon atoms or a benzenoid aryl group), —CONH—, and

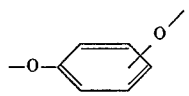

and a trivalent heterocyclic ring, $R_2$ is a tetravalent organic radical selected from the group consisting of a tetravalent butane radical, a tetravalent cyclopentane radical, a tetravalent cyclohexene radical, a tetravalent benzene ring, a tetravalent naphthalene ring and a ring of the formula

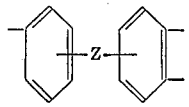

wherein Z is selected from the group consisting of a direct bond between the two benzene rings, an alkylene having from 1 to 3 carbon atoms, —O—, —S—, —SO$_2$,— —CO—, —NR— (wherein R is selected from the group consisting of an alkyl having from 1 to 4 carbon atoms or a benzenoid aryl group), —CONH—, and

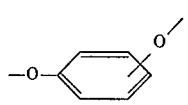

bonds (1) and (2) bond two adjacent carbon atoms in the radical $R_1$ and bonds (3) and (4) which are the same as bonds (5) and (6) bond two adjacent carbon atoms in the radical $R_2$ respectively.

5. A film forming polyamide acid amine consisting essentially of a recurring unit of the formula

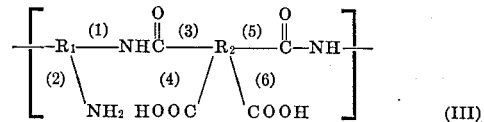

(III)

and a recurring unit of the formula

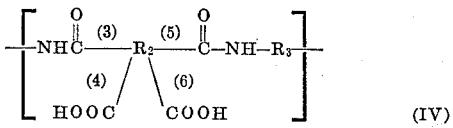

(IV)

wherein $R_1$, $R_2$, (1), (2), (3), (4), (5) and (6) have the meaning as defined in claim 4 and $R_3$ stands for a divalent organic radical having 2 to 18 carbon atoms.

6. A process for preparing a polyamide acid amine which comprises reacting by mixing at least one of the triamines selected from the group consisting of triamines having the formula

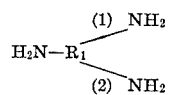

with at least one of tetra-carboxylic acid dianhydrides of the formula

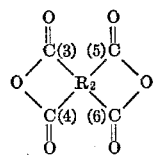

in an organic solvent containing water at a temperature below 80° C., wherein $R_1$, $R_2$ and $R_3$ have the meaning as defined in claim 5.

7. A process for preparing a polyamide acid amine which comprises reacting by mixing at least one of the triamines selected from the group consisting of triamines having the formula

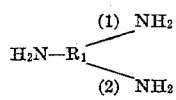

and at least one diamine having the formula $$H_2N-R_3-NH_2$$

with at least one tetracarboxylic acid dianhydride of the formula

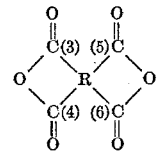

in an organic solvent containing water at a temperature below 80° C., wherein $R_1$, $R_2$ and $R_3$ have the meaning as defined in claim 5.

8. A process for preparing a polyamide acid amine of a high degree of polymerization which comprises mixing a solution obtained by dissolving at least one of the triamines selected from the group consisting of triamines having the formula

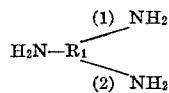

and at least one of the diamines of the formula $$H_2N-R_3-NH_2$$

in an organic solvent capable of dissolving a polyamide acid amine to be formed and a solution obtained by dissolving at least one of tetra-carboxylic acid dianhydrides of the formula

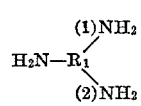

in an organic solvent which is a poor solvent for said polyamide acid amine but miscible with a solvent capable of dissolving said polyamide acid amine at a temperature below 80° C., wherein $R_1$, $R_2$ and $R_3$ have the meaning as defined in claim 5.

9. A process for preparing a polyamide acid amine of a high degree of polymeriaztion which comprises mixing a solution obtained by dissolving at least one of the triamines selected from the group consisting of triamines having the formula solving at least one tetracarboxylic acid dianhydride of the formula

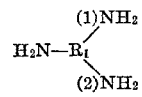

in an organic solvent which is a poor solvent for said polyamide acid amine but miscible with a solvent capable of dissolving said polyamide acid amine at a temperature below 80° C., wherein $R_1$, $R_2$ and $R_3$ have the meaning as defined in claim 5.

10. A process for preparing a polyamide acid amine which comprises reacting by mixing at least one of the triamines selected from the group consisting of a triamine of the formula

and at least one diamine of the formula $$H_2N-R_3-NH_2$$

with at least one of tetra-carboxylic acid dianhydrides of the formula

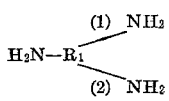

in a phenol-type solvent containing a secondary or tertiary amine at a temperature below 80° C., wherein $R_1$, $R_2$ and $R_3$ have the meaning as defined in claim 5.

11. A process for preparing a polyamide acid amine which comprises reacting by mixing at least one triamine selected from the group consisting of triamines having the formula

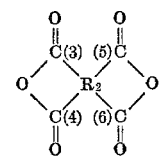

with at least one tetracarboxylic acid dianhydride of the formula

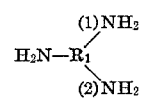

in a phenol-type solvent containing a secondary or tertiary amine at a temperature below 80° C., wherein $R_1$, $R_2$ and $R_3$ have the meaning as defined in claim 5.

12. A shaped article made of a polymer described in claim 1.

13. A process for preparing a thermally stable polymer which comprises reacting by mixing at least one of the triamines selected from the group consisting of triamines having the formula

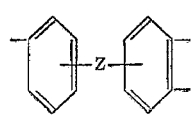

wherein $R_1$ represents a trivalent aromatic radical which is selected from the group consisting of a trivalent benzene ring, a trivalent naphthalene ring, a radical of the formula wherein Z is selected from the group consisting of a direct bond between two benzene rings, an alkylene having from 1 to 3 carbon atoms, —O—, —S—, —SO$_2$—, —CO—, —NR— (wherein R is an alkyl having 1 to 4 carbon atoms or a benzenoid aryl group), —CONH— and

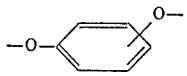

and a trivalent heterocyclic ring, with at least one tetracarboxylic acid dianhydride having the formula

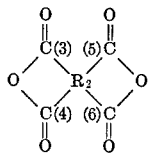

wherein R$_2$ is a tetravalent organic radical selected from the group consisting of a tetravalent butane radical, a tetravalent cyclopentane radical, a tetravalent cyclohexane radical, a tetravalent benzene ring, a tetravalent naphthalene ring and a ring of the formula

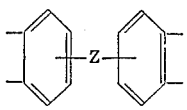

wherein Z is selected from the group consisting of a direct bond between the two benzene rings, an alkylene having from 1 to 3 carbon atoms, —O—, —S—, —SO$_2$—, —CO—, —NR— (wherein R is selected from the group consisting of an alkyl having from 1 to 4 carbon atoms or a benzenoid aryl group), —CONH—, and

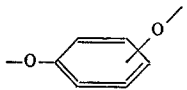

bonds (1) and (2) bond two adjacent carbon atoms in the radical R$_1$ and bonds (3) and (4) which are the same as bonds (5) and (6) both adjacent carbon atoms in the radical R$_2$ in an organic solvent at a temperature below 80° C. and heating the obtained poly acid amide at a temperature above 50° C. so as to dehydrate same.

14. A process for preparing a thermally stable polymer which comprises reacting at least one of the triamines selected from the group consisting of triamines having the formula:

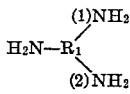

wherein R$_1$ stands for a trivalent aromatic radical which is selected from the group consisting essentially of a trivalent benzene ring, a trivalent naphthalene ring, a radical of the formula

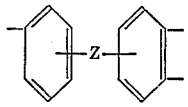

wherein Z is selected from the group consisting essentially of a direct bond between two benzene rings, an alkylene having from 1 to 3 carbon atoms, —O—, —S—, —SO$_2$—, —CO—, —NR— (wherein R is an alkyl having 1 to 4 carbon atoms or a benzenoid aryl group), —CONH—, and

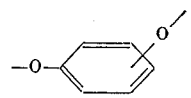

and a trivalent heterocyclic ring, and at least one of the diamines having the formula

H$_2$N—R$_3$—NH$_2$ wherein R$_3$ represents a divalent organic radical having from about 2 to about 18 carbon atoms with at least one of the tetracarboxylic acid dianhydrides of the formula

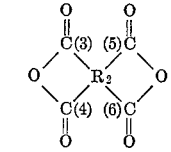

wherein R$_2$ is a tetravalent organic radical selected from the group consisting of a tetravalent butane radical, a tetravalent cyclopentane radical, a tetravalent cyclohexane radical, a tetravalent benzene ring, a tetravalent naphthalene ring and a ring of the formula

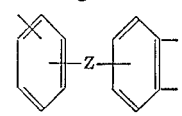

wherein Z is selected from the group consisting of a direct bond between the two benzene rings, an alkylene having from 1 to 3 carbon atoms, —O—, —S—, —SO$_2$—, —CO—, —NR— (wherein R is selected from the group consisting of an alkyl having from 1 to 4 carbon atoms or a benzenoid aryl group), —CONH—, and

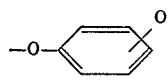

bonds (1) and (2) bond two adjacent carbon atoms in the radical R$_1$ and bonds (3) and (4) which are the same as bonds (5) and (6) both adjacent carbon atoms in the radical R$_2$ in an organic solvent at a temperature below 80° C. and heating the obtained poly acid amide at a temperature above 50° C. so as to dehydrate same.

References Cited

UNITED STATES PATENTS 3,190,856  6/1965  Lavin et al. _____ 260—65

OTHER REFERENCES

Bell et al.: Polyimidazopyrrolones: A New Route to Ladder Polymers, Journal of Polymer Science, vol. 3, pp. 977–984, December 1965.

WILLIAM H. SHORT, Primary Examiner

L. L. LEE, Assistant Examiner

U.S. Cl. X.R.

117—128.4, 161; 161—227; 260—30.4, 30.6, 30.8, 32.4, 32.6, 33.6, 33.8, 65, 78, 78.4